No. 852,736. PATENTED MAY 7, 1907.
G. MOTHES.
PRODUCTION OF GLOBOIDAL WORM WHEELS.
APPLICATION FILED SEPT. 3, 1901.
2 SHEETS—SHEET 1.
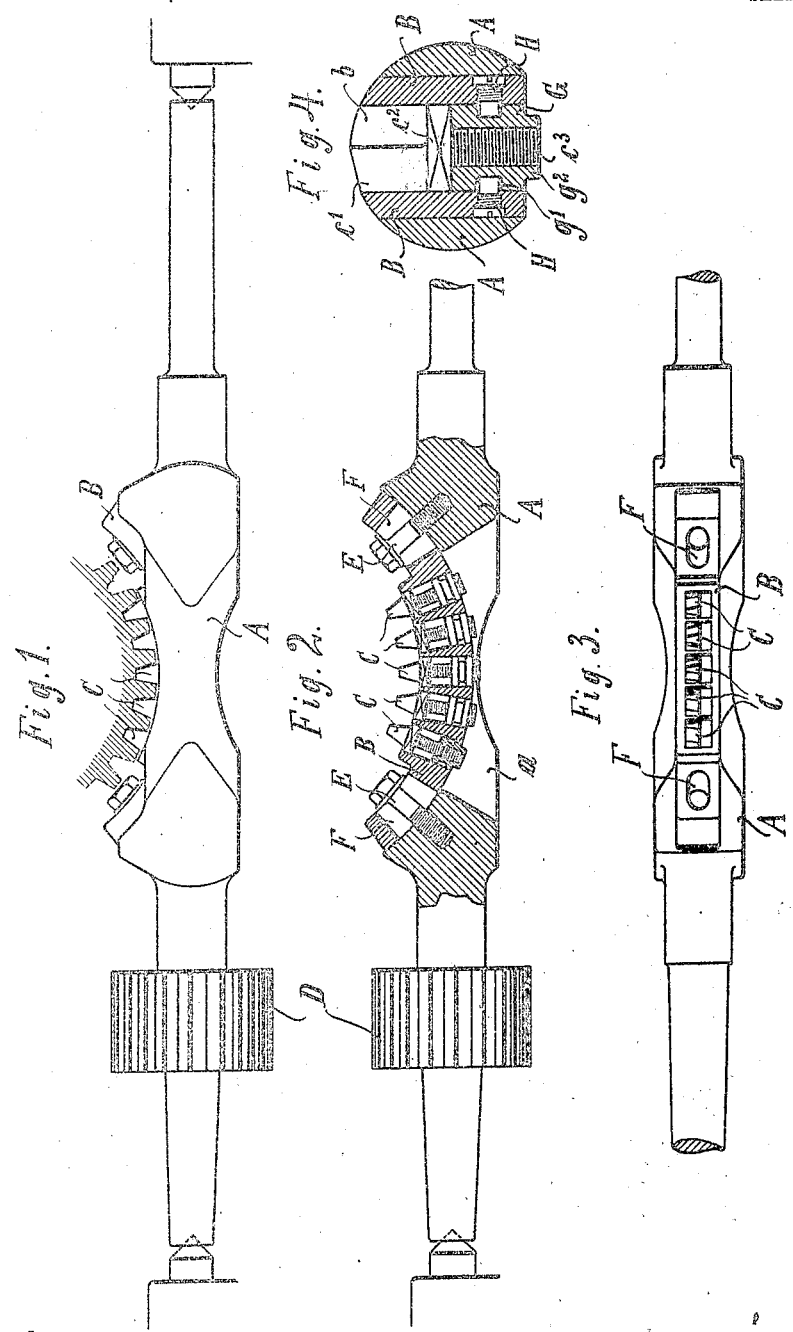

No. 852,736. PATENTED MAY 7, 1907.
G. MOTHES.
PRODUCTION OF GLOBOIDAL WORM WHEELS.
APPLICATION FILED SEPT. 3, 1901.
2 SHEETS—SHEET 2.
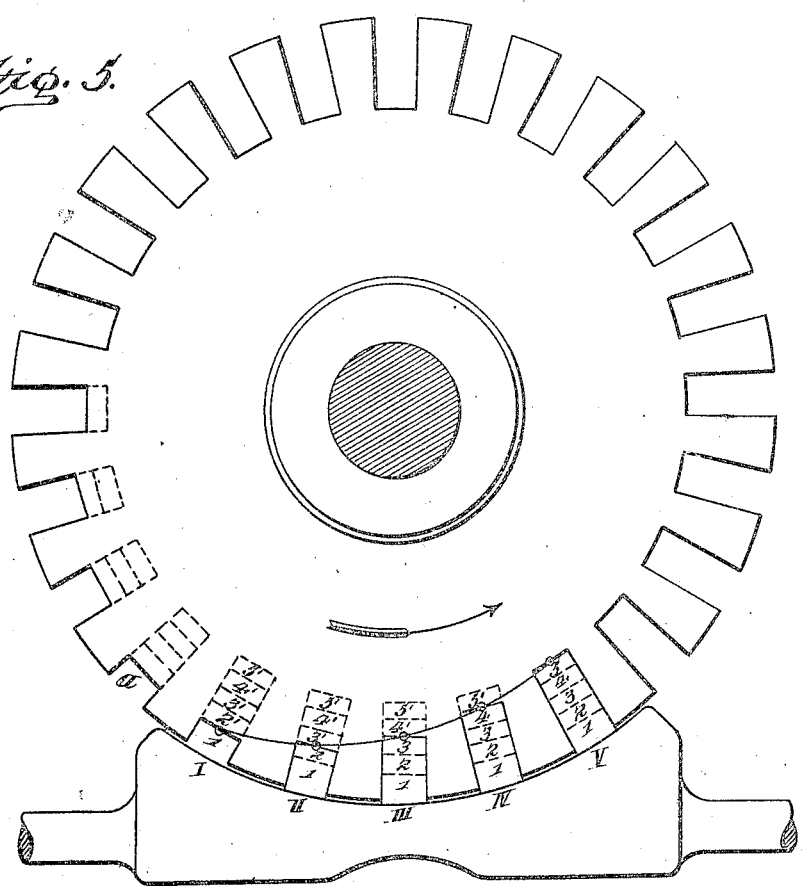
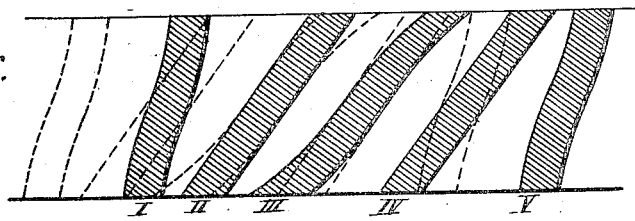
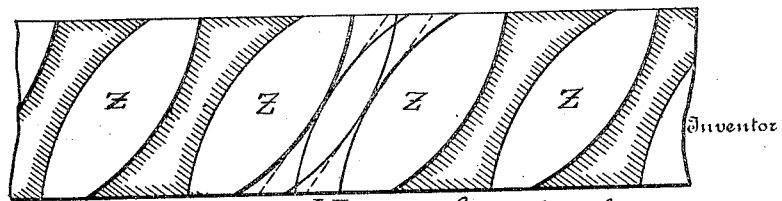

UNITED STATES PATENT OFFICE.

GEORG MOTHES, OF RÜTTENSCHEID, NEAR ESSEN-ON-THE-RUHR, GERMANY, ASSIGNOR TO FRIED. KRUPP, OF ESSEN-ON-THE-RUHR, GERMANY.

PRODUCTION OF GLOBOIDAL WORM-WHEELS.

No. 852,736.      Specification of Letters Patent.      Patented May 7, 1907.

Application filed September 3, 1901. Serial No. 74,140.

*To all whom it may concern:*

Be it known that I, GEORG MOTHES, engineer, residing at 40 Andreasstrasse, Rüttenscheid, near Essen-on-the-Ruhr, Germany, have invented certain new and useful Improvements in the Production of Globoidal Worm-Wheels, of which the following is a specification.

The present invention relates to the production of globoidal worm-wheels and consists specifically in a process, whereby it is possible to construct teeth on a globoidal worm-wheel, which approach, within the desired degree of accuracy, to theoretically correct teeth.

Heretofore, in making globoidal worm-wheels, cutters have mostly been used, of the form of the globoidal worm constructed in one piece. By using such cutters the feed must be effected perpendicularly to the axis of rotation by advancement of either the tool or the work-piece, and they are available, not universally, but only in cases where, in consequence of the restricted length of the globoidal worm, and particular shape of screw thread selected, there is no undercut in the sides of the teeth. But in cases where it is required to have the worm cover a greater area of the worm-wheel, in which case greater advantages arise from the use of the globoidal worm gearing instead of the common form, it is impossible to construct the globoidal worm-wheel by means of a cutter having the form of the finished globoidal worm.

By the process which forms the subject of the present invention it becomes possible to cut in a globoidal worm-wheel theoretically correct teeth of every form to the desired degree of accuracy, without the use of a cutter of the form of the finished globoidal worm.

The accuracy and success of the process are based upon the following considerations:—

If one contemplates a number of planes through the axis of the globoidal worm, the section profiles of the worm thus produced all differ, one from another. The profile of the screw threads of every section is, with regard to its neighboring section, advanced a fraction of a pitch on the worm. The extent of this difference is naturally dependent on the angles of the respective cutting planes, *e. g.* an angle of 180°, equals a half pitch, and 90° a quarter pitch. Now since all the different axial sections of the globoidal worm, in the course of one revolution of the latter, come into engagement with the globoidal worm-wheel, it is evident that to cut theoretically correct teeth an infinite number of cuts to agree with the sectional profiles would have to be made in the rim, but by making a sufficient number of the cuts, teeth may be obtained that approaches sufficiently near to theoretical correctness to answer practical purposes. In other words, the worm-wheel blank is cut first to provide grooves which correspond to the working portions of the globoidal worm which would be in engagement with the globoidal worm-wheel at one time, and the grooves thus formed are then cut to correspond with working portions of the worm which would be in engagement with said wheel at another time.

The manner of carrying out the process will now be described, by way of illustration upon the basis of an apparatus shown in the accompanying drawings, in which Figure 1 is a plan view; Fig. 2 is a horizontal section; Fig. 3 is a side-view of the apparatus; Fig. 4 is a detail view on an enlarged scale and Figs. 5 to 7 are diagrammatic views.

The apparatus for cutting globoidal worm-wheels has been claimed in my copending application filed September 3, 1901, Serial No. 74,141 and consists essentially of a tool carrier, A, a bit holder, B, and a number of adjustable profile cutting bits, C.

The tool-carrier A has the form of a shaft, which has a reinforced flat middle portion; it is suspended between centers or otherwise in the machine which serves for manipulating it in cutting globoidal gears, and through the medium of a splined pinion D, has imparted to it a rotation positively dependent on the rotation of the work-piece, and corresponding to the rotation which the finished globoidal worm receives when in use. The proportions of the tool-carrier must naturally, as will be seen from the drawing, be so determined that it will not interfere with the work-piece in turning. For this purpose, the center of the tool-carrier A, which lies in the immediate vicinity of the work-piece, must be of the same shape as the core of the finished globoidal worm.

In a recess of the tool-carrier concentric with the circumference of the globoidal worm-wheel is adjustably mounted a correspondingly curved bit holder B. For securing the latter in any desired position two screws E are inserted in the tool-carrier, which screws pass through slots F in the bit holder. The length of the slots F is so regulated that the bit holder may be shifted through an arc corresponding to the pitch it being shown in the drawing in the middle position. The bit holder serves for the reception of a row of cutting bits C, the number of which corresponds to the number of clearance spaces between the teeth of the worm-wheel which are to be in engagement with the globoidal worm at any one time. There are five of these shown in the drawing. Each bit (see Fig. 4) consists of a cutting part proper $c^1$ whose trapezoidal profile corresponds to that of the screw threads of the globoidal worm; also a rectangular guiding shank $c^2$ and the screw-threaded shank $c^3$ by means of which the advancement of the bit is effected. The several bits lie in radial perforations of the bit holder, the space between the perforations naturally depending upon the pitch. The inner part of each perforation $b$ extending toward the center of the curve of the bit holder, is used as a guide for the guiding shank $c^2$ and is likewise rectangular, and of such depth that the cutting portion $c^1$ can be fully retracted within the bit holder, while the remaining outwardly extending portion of the opening $b$ is bored cylindrically. In the latter part is located a cylindrical nut G provided with an exterior annular recess $g^1$, which nut is screwed upon the threaded shank $c^3$ and may be rotated; a movement of the nut in an axial direction is prevented, however, by two set screws H which are screwed into the wall of the bit holder from the outside and enter the annular recess $g^1$ of the nut. By turning the nut G by means of a key applied to the rectangular portion $g^2$ of the same, the bit C can be adjusted out of or into the bit holder. In the innermost position the threaded shank $c^3$ is screwed fully into the nut G; in the outermost position several turns of the thread still remain in engagement with the nut. In order that the several nuts for adjustment of the cutting bits may be accessible from without, the tool holder is provided with a broad slot $a$.

It will thus be seen that there is employed a rotating tool, the axis of rotation of which, during the entire course of the work, bears the same relation to the axis of the worm-wheel to be cut, as the axis of the appurtenant globoidal worm bears to said worm-wheel axis during driving action, by means of which there is made in the periphery of the wheel cuts corresponding to the longitudinal sections at different angles through the axis of the appurtenant globoidal worm. In accomplishing this the tool and the work-piece are compelled to rotate in a relation corresponding to that of the members of the globoidal worm gearing, when in use, and the position of the profile represented by the cutting edges of the tool with respect to the worm wheel to be cut is the same as that of the globoidal worm when in use.

The cutting of the globoidal worm-wheel by means of the above described apparatus is accomplished in the following manner; the work-piece and the tool-carrier are suspended in the machine; the cutting bits are arranged in the bit holder in their inner position, and the bit holder may, for example, assume the central position shown in the drawing. After the cutting bits have been advanced for the thickness of a chip toward the work-piece the machine is set in operation. When the tool carrier rotates on its axis, all the bits will each cut a groove of depth 1, (see Fig. 5) out of the rim of the wheel blank. As the cutting edges of the outer bits are at a greater distance from the axis of the tool carrier than the cutting edges of the middle bits, the outer bits revolve quicker than the middle bits. The worm-wheel rotates in unison and freely with the tool carrier, so that the single grooves cut in the rim of the blank by bits I—V are of different shapes, as is shown in Fig. 6. The rotation of the wheel blank is such that during the first step the tool carrier has turned once over a part of the wheel. In consequence, when the bits II—V, after the first cut and following first rotation of the tool carrier, again reach the wheel surface, there is no more full material to be found, but the groove made by the first cut of the bits I—V. On this second cut (shown in Fig. 6 in dotted line) which crosses the grooves made in the first cut, the bits will have to take away less material of depth 1, so the machine in the construction shown is stopped and the bits II—V may, without overwork, be advanced one chip. They will then occupy the position 2 (see Fig. 5). Bit I will find full material on every revolution of the tool carrier until it reaches the groove made by the bit V in the first cut. By the second cut the bits will occupy the places 1, 2, 2, 2, 2, Fig. 5. On the third cut bit II will meet with a groove made by bit I from depth 1 on the second revolution of the tool carrier, and can therefore not be advanced as it would have to be passed through two depths. The bits III—V will each meet with a groove made by bits II—IV of depth 2, and can therefore all be advanced one depth. The bits I—V will now have positions 1, 2, 3, 3, 3. On the fourth cut, the bit III will meet with a groove of depth 2 made by bit II on the third revolution of the tool carrier and is therefore not advanced. Bits IV—V however each meet with a groove made by bits III—IV of depth 3, and therefore are advanced, the bits on the fourth cut occupying the positions 1, 2, 3, 4. On the fifth cut, the bit IV is not advanced, as it will meet with a groove made by bit III of depth 3. But bit V meets with a groove made by bit IV of depth 4 and is advanced. The bits I—V have now positions 1, 2, 3, 4, 5.

The bits retain the positions given on the last advance on further cutting until they meet with the grooves $a$, (Fig. 5) made in the first cut by bit V of depth 1, Bit I can thus before the beginning of the ($n$—4th) cut be advanced one depth and take then the position marked in Fig. 5 with $2^1$. The bits II—V are not advanced. The bits will by the ($n$—4th) cut occupy the positions $2^1$, 2, 3, 4, 5. It is now easily seen from Fig. 5 that the positions of the bits are: after $n$—3rd cut $3^1$, $3^1$, 3, 4, 5. After $n$—2nd cut $4^1$, $4^1$, $4^1$, 4, 5. After $n$—1st cut $5^1$, $5^1$, $5^1$, $5^1$, 5.

If all the grooves are cut in the full depth in the wheel by the cut, they will give in their collectiveness a space between the teeth, somewhat like Fig. 7, the standing teeth of the worm-wheel being marked with $z$.

There has now been cut in the rim of the wheel a groove corresponding to the working portion of the globoidal worm wheel which would be in engagement with the globoidal worm wheel at one time, and as before stated to obtain correct teeth a number of cuts must be made. A second cut which for example corresponds to a section through the axis of the globoidal worm at an angle of 180° from the first is now begun. For this purpose the machine is stopped and the bit holder is shifted in the tool carrier by means of slots F and screws E through the distance of the angle corresponding to the half pitch to the right or to the left. Thereupon the driving connections of the tool carrier are uncoupled from the driving connections of the work-piece and while the work-piece stands still the tool carrier is turned 180° to destroy the relation between the worm-wheel and the bits and then the coupling of the driving connections are again restored. The cutting of the grooves proceeds in the same manner as previously set forth. If now a sectional profile corresponding to a section through the axis of the globoidal worm at an angle of 90° from the preceding one is to be produced it is obvious that the tool-carrier must be turned 90° and the bit holder shifted for an angle corresponding to a quarter pitch. If the angle which the plane of the section makes with that of the previous section is represented by $x$ and the pitch is designated by $t$ then the extent of adjustment of the bit holder in the arc will be indicated by $\frac{t\,x}{360}$ while the turning of the tool holder must naturally be $x°$. The direction in which the tool carrier is to rotate and the direction in which the bit holder is to be shifted, depends upon the direction in which the angle $x$ is reckoned, that is to say, whether the globoidal worm to be employed with the worm-wheel is right handed or left handed, and may be obtained through a simple consideration without further explanations.

A greater or lesser number of cuts corresponding to the sectional profiles of the globoidal worm are made in the periphery of the worm-wheel according to the desired degree of accuracy. In many cases the cutting of four perpendicularly arranged sections will give ample exactness to the teeth of the worm-wheel.

As will be readily observed, by the use of two tools, two different cuts may be made in the wheel upon different sides of the work-piece diametrically opposite and the manufacture of worm-wheels thus rendered more rapid. Moreover, in globoidal worms of sufficiently large diameter upon which the dimensions of the tool carrier depend, there could be arranged in one and the same tool carrier more than one bit holder and in this manner more than one profile cut simultaneously.

It is to be understood that I do not desire to be limited to the radially adjustable cutters and that I wish to claim broadly a construction by which grooves are cut into the worm-wheel blank to correspond to working portions of the globoidal worm which would be in engagement with the globoidal worm at one time and the grooves thus formed are cut to correspond with other working portions of the worm which would be in engagement with said wheel at another time.

Claims.

1. The process of forming globoidal worm wheels which consists in rotating on axes unadjustable to one another during the formation of a complete wheel having teeth of any depth, a wheel blank, and a plurality of cutters representing a single profile corresponding to an axial section through the globoidal worm, cutting said profile into the whole rim of the wheel blank, then successively causing the said cutters to represent other profiles corresponding to different axial sections through the globoidal worm, and successively cutting said other profiles into the whole rim of the wheel blank.

2. The process of forming globoidal worm wheels which consists in rotating at the same relative speed a wheel blank about one axis and a plurality of cutters representing a section of a worm about another axis, in a position to operate on the wheel blank, to remove a portion of the material between the teeth portions of the blank; and advancing the cutters radially toward the axis of the blank without advancing the axis around which the cutters rotate, to remove further portions between the teeth portions.

In testimony whereof I have hereunto set my hand in the presence of two subscribing witnesses.

GEORG MOTHES.

Witnesses:
 CHAS. L. COLE,
 PAUL ARRAS.